Nov. 7, 1961 E. G. MILLIS ET AL 3,008,090

D.C. AMPLIFIER

Filed July 3, 1958

3 Sheets-Sheet 1

INVENTORS
EDWIN G. MILLIS AND
ROBERT A. SHEARER

BY Stevens, Davis, Miller & Mosher
ATTORNEYS

INVENTORS
EDWIN G. MILLIS AND
ROBERT A. SHEARER
BY Stevens, Davis, Miller & Mosher
ATTORNEYS INVENTORS
EDWIN G. MILLIS AND
ROBERT A. SHEARER
BY Stevens, Davis, Miller & Mosher
ATTORNEYS 3,008,090

D.C. AMPLIFIER

Edwin G. Millis and Robert A. Shearer, Houston, Tex., assignors to Texas Instruments Incorporated, Dallas, Tex., a corporation of Delaware Filed July 3, 1958, Ser. No. 746,464
7 Claims. (Cl. 330—10)

The present invention relates to direct-current amplifiers and more particularly to amplifiers employing D.C.-to-A.C.-to-D.C. conversion.

In accordance with the present invention direct current signals are applied to a modulator having a carrier input derived from a temperature-stabilized oscillator. The output signals from the modulator are A.C. carrier signals, amplitude modulated in accordance with the amplitude of the D.C. input signals. The alternating signals thus developed are amplified in an A.C. amplifier and demodulated by a demodulator, which develops a direct current signal which is an amplified version of the original direct current signal input. The demodulator circuit may, for example, feed a galvanometer type recorder directly, and in accordance with one aspect of the present invention, the output impedance of the demodulator is relatively high, so as to provide for proper damping of the galvanometer mechanism of the recorder.

The specific modulator employed has an A.C. output versus D.C. input voltage characteristic such that an A.C. output signal is produced even though no D.C. input signal is applied thereto. In order to compensate for this modulator characteristic, the apparatus is provided with a bucking current generator which is adapted to produce a direct current in opposition to the direct current developed by the demodulator to eliminate deflections of the galvanometer when the input signal attains zero value. The bucking current generator has high output impedance in order to provide appropriate damping for the galvanometer mechanism.

The modulator is provided with a circuit for shifting the operating range of the instrument, so that operation may be achieved over the linear portions of the operating range of the modulator, and further for modifying the operating range so that the modulator may respond to signals of one polarity only, or to signals of either polarity.

The specific modulator utilized with the apparatus of the invention employs transistors as switching devices, but since true open circuit operation of a transistor is difficult of achievement, a bucking circuit is employed to eliminate the effects of residual conduction through the transistors, when nominally biased to cut-off.

The oscillator employed to provide a carrier or A.C. input signal to the demodulator comprises a conventional phase-shift oscillator having a very simple, but highly effective temperature stabilization system. In accordance with this aspect of the present invention, a transistor is employed as the active element of the oscillator and a primary winding of an output transformer is employed as the transistor load. A temperature sensitive diode is placed in shunt with the primary winding of the transformer and provides a slight clipping action on one phase only of the output voltage. The diode is temperature sensitive and effectively increases its conduction with temperature as does the transistor, whereby the clipping effect becomes more pronounced as the temperature rises to compensate for increased transistor conductivity as temperature rises. In consequence, the oscillator possesses negligible amplitude variation with temperature over the range 30° to 130° F.

It is accordingly, an object of the present invention to provide an amplifier capable of driving a galvanometer-type recorder having linearity of better than 1% full scale.

It is another object of the present invention to provide an amplifier for a galvanometer type instrument having readily shiftable scales, which may be readily and accurately zero-adjusted.

It is yet another object of the present invention to provide an amplifier for galvanometer-type recorders having an output impedance as seen by the galvanometer of sufficient magnitude to provide proper damping of the galvanometer.

It is another object of the present invention to provide an amplifier for galvanometer-type recorders having a transistorized modulator including a circuit for compensating for residual current flow in a transistor switching device.

It is still another object of the present invention to provide an amplifier for galvanometer type recorders wherein direct current signals are converted to alternating current signals in a modulator and are thereafter amplified and demodulated; the amplifier including a transistorized oscillator having a highly efficient but simple temperature compensation system.

It is yet another object of the present invention to provide an oscillator having a simple but efficient temperature compensating circuit.

It is another object of the present invention to provide a transistorized modulator having a circuit for varying the zero input versus output characteristic of the modulator and having, in addition, a circuit for compensating for residual current flow in transistor when in non-conductive condition.

Other objects will become apparent from the following detailed description of a preferred embodiment when taken with the drawings in which.

Figure 5:
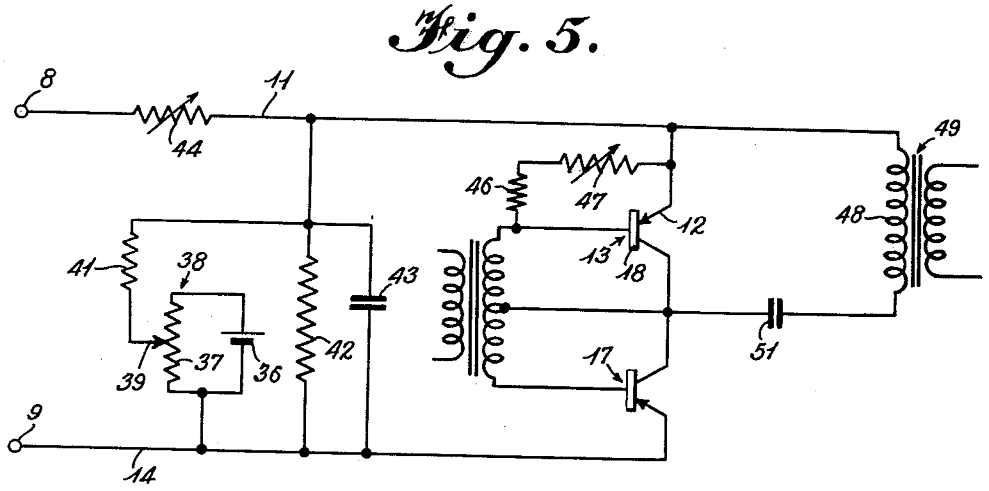
FIGURE 5 is a schematic circuit diagram of a complete modulator circuit according to the present invention.
Figure 6:
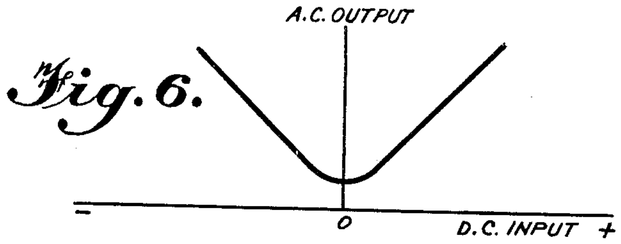
Figure 7:
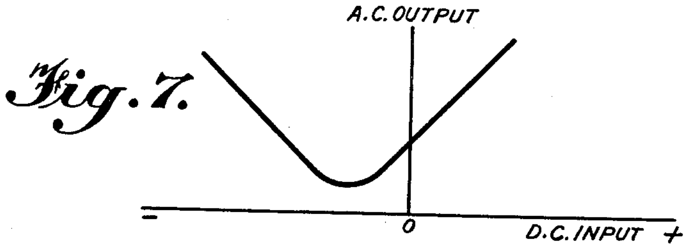
Figure 8:
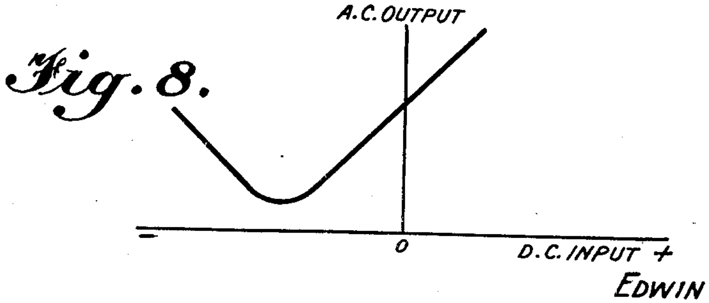
Figure 9:
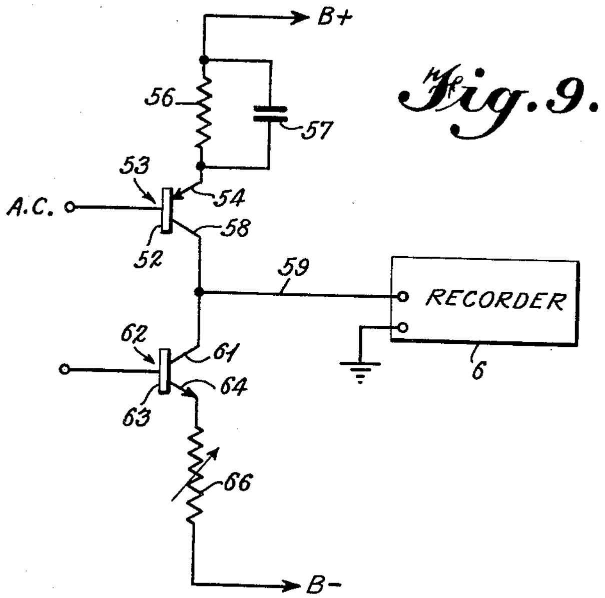
Figure 10:
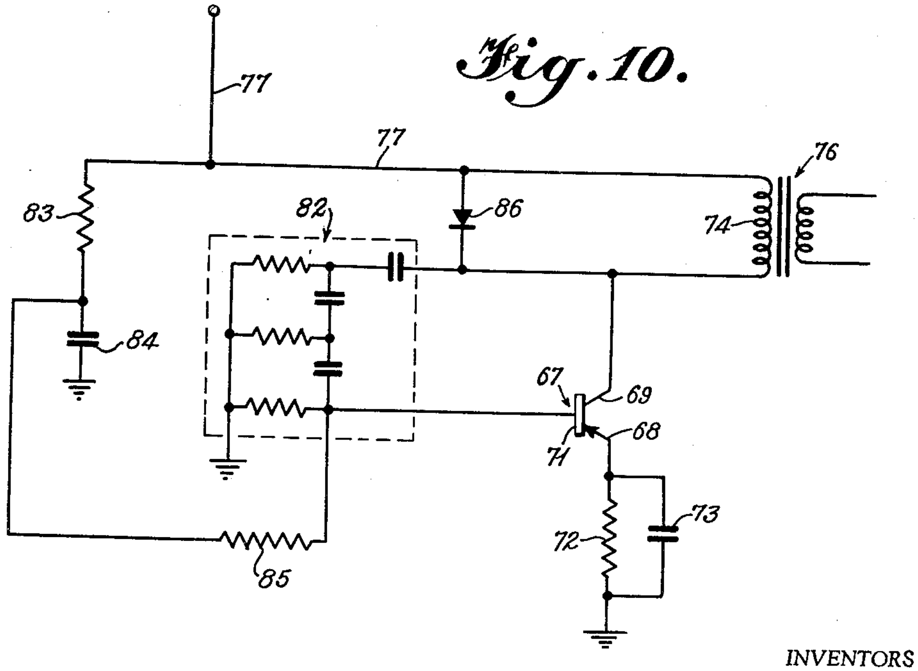

FIGURES 6–8 inclusive, are plots of A.C. output voltage versus D.C. input voltage, employed in explaining the operation of the circuit of FIGURE 5;

FIGURE 9 is a schematic circuit diagram of the demodulator and bucking current generator of the system of the present invention; and FIGURE 10 is a schematic circuit diagram of an oscillator employed in the system of the invention.

Figures 1, 2, 3, 4:
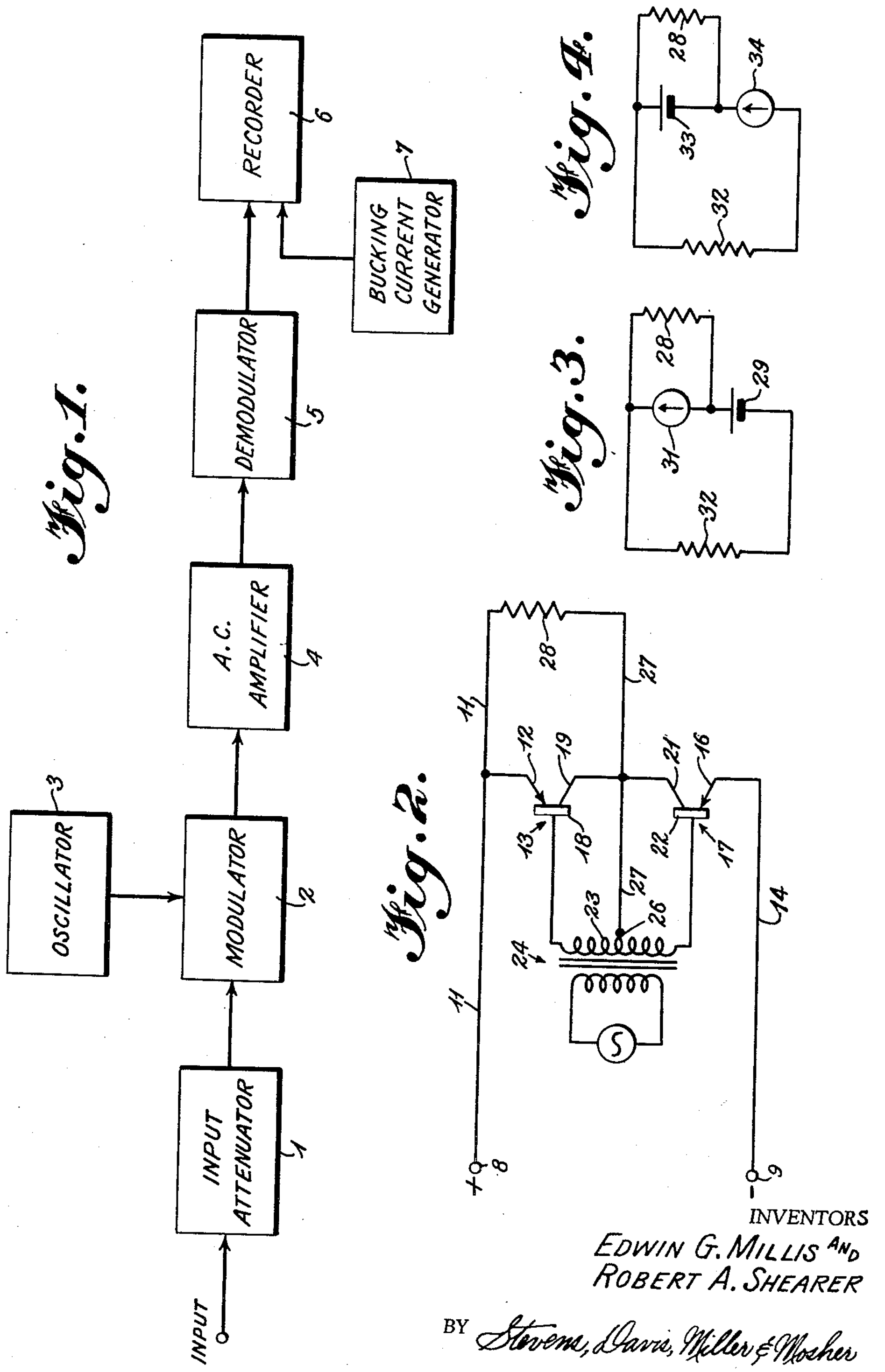
FIGURE 1 is a schematic block diagram of a preferred embodiment of the amplifier of the present invention.
FIGURE 2 is a schematic circuit diagram of a modulator circuit employed in the apparatus of the present invention.
FIGURES 3 and 4 are equivalent circuit diagrams which are employed to explain the operation of the circuit of FIGURE 2.

Referring specifically to FIGURE 1 of the accompanying drawings, which is a schematic block diagram of the amplifier system of the present invention, D.C. input signals are applied via an input attenuator 1 to a modulator 2, having A.C. carrier signals applied thereto from an oscillator 3. The A.C. signals developed in the modulator 2 are amplified by an A.C. amplifier 4 and applied through a demodulator 5 to a galvanometer type recorder 6, representing an exemplary load for this system.

As will become apparent as the description of the various specific circuits of the system proceeds, the modulator 2 is of a type which produces an A.C. output signal whether or not an input signal is applied thereto. In consequence, means are provided for offsetting this undesirable effect in the form of a bucking current generator 7, which provides a variable current in opposition to the current supplied by the demodulator 5. The current supplied by the generator 7 may be varied at will, in order to reduce the input to the recorder 6 to zero value when the D.C. input to the attenuator 1 is at zero potential.

The apparatus illustrated in FIGURE 1, in order to be employed in a high-quality instrument, must have a linear input versus output characteristic over substantially its entire operating range and must be insensitive to temperature and line voltage disturbances. The modulator of the present invention is particularly responsible for the linearity of the system, whereas the oscillator 3 is the element which primarily imparts required temperature stability to the system.

Reference is now made to FIGURE 2 of the accompanying drawings, by which means the operation of the modulator circuit 2 is explained more fully. The modulator circuit illustrated in FIGURE 2 comprises a pair of D.C. input terminals 8 and 9, with the terminal 8 connected via a lead 11 to an emitter electrode 12 of a first PNP-type transistor 13. The terminal 9 is connected via a lead 14 to an emitter electrode 16 of second PNP-type transistor 17. The transistor 13 is provided with a base electrode 18 and a collector electrode 19, which is connected to a collector electrode 21 of the transistor 17. The transistor 17 is further provided with a base electrode 22. The secondary winding 23 of an input transformer 24 is connected between the base electrodes 18 and 22 of the transistors 13 and 17, respectively. The secondary winding 23 of the transformer 24 is provided with a center tap 26, connected via a lead 27 to the collector electrodes 19 and 21 of the transistors 13 and 17, respectively, and to one end of a load resistor 28. The other end of the load resistor 28, as viewed in FIGURE 2, is connected to the lead 11 and, therefore, to the emitter electrode 12 of the transistor 13.

The operation of the basic modulator circuit may be explained by reference to FIGURES 3 and 4, which are equivalent circuit diagrams of the modulator in various conditions of its operation. Upon a positive excursion of the voltage applied to the base electrode 18 of the transistor 13 and a negative excursion of the voltage applied to the base electrode 22 of the transistor 17, the transistor 17 becomes conductive and the transistor 13 becomes essentially non-conductive. During the period of conduction of the transistor 17, reference being now made specifically to FIGURE 3, it appears as a constant voltage source 29 while the transistor 13, being substantially cut-off, appears as a constant current generator 31 of small output. The load impedance of the D.C. signal source applied across terminals 8 and 9 in FIGURE 2 is represented by the resistor 32 while the load resistor bears the numeral 28, as in FIGURE 2. Under these conditions substantially all of the D.C. current applied from the D.C. signal source flows through the resistor 28, the voltage of the D.C. signal source being reduced by the small voltage of voltage source 29. During the opposite half cycle of operation, which is represented by FIGURE 4, the transistor 13 becomes conductive, and therefore, is represented by a fixed potential 33 while the transistor 17 becomes substantially non-conductive and therefore is represented by a very small constant current generator 34. During this condition of operation, only a very small current flows through the load resistor 28, as determined by the voltage across the transistor 13, or referring to FIGURE 4, the voltage of the source 33. Therefore, the operation of the system is such that a large current flows through the resistor 28 in the cycle of operation illustrated in FIGURE 3, while a very small current flows through the same resistor during the operation illustrated in FIGURE 4.

By providing A.C. coupling to the load resistor 28 an alternating current is derived having a modulation envelope which is a function of the D.C. signal applied across the terminals 8 and 9 of the circuit illustrated in FIGURE 2. Difficulties exist, in operation of the circuit, illustrated in FIGURE 2, as a result of variations of source impedance of the D.C. signal, that is, variations of the impedance of the resistor 32 illustrated in FIGURES 3 and 4. In order to exemplify the variations of operation with changes in the impedance of the input circuit, assume in FIGURES 3 and 4 that the impedance 32 is reduced to zero.

Under these conditions the current generator 31 in FIGURE 3 and the current generator 34 in FIGURE 4 would be effectively shorted out and the voltage generators 29 and 33 would be applied across small impedances. In the circuit of FIGURE 4, if the impedance 32 increases to infinity, the current flowing through the load resistor 28 will not change. In the circuit of FIGURE 3, when the impedance 32 is zero and the current source is effectively shorted out, substantially no current from the source 31 will flow through the load resistor 28. If the impedance 32 increases to infinity, all the current from the source 31 will flow through the load resistor 28. Thus it can be seen that in FIGURE 3 the amount of current from the current source 31 flowing through the load resistor 28 will vary substantially with changes in the impedance 32. Therefore, in the part of the cycle represented by FIGURE 3 when the transistor 13 is cut off, the impedance of the D.C. signal source applied across terminals 8 and 9 will have a substantial effect upon the current flowing through the load resistor 28. In a quality instrument such variation cannot be tolerated.

In accordance with the present invention, reference being now made to FIGURE 5 of the accompanying drawings wherein elements common to FIGURES 2 and 5 bear the same reference numeral, a constant current source is provided to buck out the current generated by the transistor 13 during its cut-off period. The constant current source comprises a standard cell 36 having connected thereacross a resistive element 37 of a potentiometer 38, also having a variable tap 39. The lower ends, as viewed in FIGURE 5, of the resistor 37 and battery 36 are connected in common to the lead 14, while the tap 39 is connected via an impedance 41 to lead 11. The trap 39 is adjusted so that the current supplied by the circuit is exactly equal to the current through the transistor 13 during its cut-off interval and is also opposed thereto, so that the two currents precisely cancel out. In consequence, the current flow through the load 48 is unaffected by source impedance change.

A variable resistor 44 is inserted in the lead 11 to provide an appropriate input impedance for the circuit, the impedance 44 being a value sufficiently large that changes in modulator impedance will have little effect on total input impedance. Likewise this value is small enough that changes in source or attenuator impedance will not materially reduce the effectiveness of the bucking current generator.

Directly shunting both transistors is resistor 42 and capacitor 43. Resistor 42 serves as a relatively low impedance path, with reference to resistance 44 and any large source impedance across input terminals 8 and 9, for the current generated by transistor 13 during its cut-off period. Capacitor 43 serves as a low impedance A.C. path to the currents generated by the transistor 13 during its cut-off periods so as to minimize zero shift due to the residual A.C. voltages produced.

In addition to the elements previously discussed, with respect to the modulator 2, there is provided a fixed resistor 46 and a variable resistor 47 connected in series between the emitter electrode 12 and base electrode 18 of the transistor 13. The purpose of the resistors 46 and 47 becomes apparent upon a discussion of the graphs provided in FIGURES 6–8 of the accompanying drawings. FIGURE 6 is a graph of the A.C. output voltage of the modulator 2 plotted against the D.C. input voltage, in the absence of the resistors 46 and 47. It will be noted that two conditions exist which are not appropriate in a precision instrument. The first of these conditions is that the graph is not linear in the region of zero D.C. input voltages and the second condition is that the graph does not pass through the origin, or in other words, an A.C. output voltage is produced even though there is no D.C. input voltage. The resistors 46 and 47 are employed to correct the first of these conditions, whereas the bucking current generator 7 is employed to correct the second of these conditions.

Referring now to FIGURE 7, the resistors 46 and 47 are employed to shift the D.C. output voltage curve with respect to the origin so that only a linear portion of the curve appears to the right of the origin, as viewed in FIGURE 7. In FIGURE 7 the shift is only sufficient to assure that a linear portion of the curve subsists to the right of the line, and therefore, the system should receive only positive D.C. input voltages. Negative D.C. input voltages would obviously involve operation of the modulator on a non-linear portion of the curve and a portion of the curve having a negative slope. If the instrument is to be capable of accepting both positive and negative input voltages, the A.C. output characteristic should be shifted so that the linear portion of the characteristic is centered on the vertical axis, that is, centered on the zero D.C. input axis.

The shifting of the output characteristic of the modulator 2 by the resistors 46 and 47 will now be described. It is apparent that resistors 46 and 47 provide a continuous circuit through the load impedance, which, in the circuit illustrated in FIGURE 5 is a primary winding 48 of the transformer 49 and a capacitor 51 connected in series. The current flowing through the transformer primary 48 occurs only when transistor 13 is in a non-conducting state. Therefore, the signal developed across the transformer primary winding 48, in consequence of the operation of the modulator, has superposed thereon a half wave A.C. signal, which is a function only of the impedance of resistors 46 and 47. As is indicated above, the signal produced as a result of the modulating action is a half-wave signal, this being produced only when the transistor 17 is conductive. The addition of an in-phase half wave voltage, due to resistors 46 and 47, to the half-wave voltage developed by the modulating action, shifts the center line of the A.C. signal and in consequence shifts the characteristic curve, illustrated in FIGURES 6–8 with respect to the zero input signal axis. The amount of the shift of the characteristic is determined by the impedance of the variable resistor 47, a maximum shifting effect being achieved by reducing the value of resistor 47 to zero.

Referring again to the fact that the characteristic of the modulator 2 does not pass through the origin and that the bucking circuit 7 is employed to overcome this deficiency, reference is now made to FIGURE 9 of the accompanying drawings, which illustrates the demodulator circuit 5 and the bucking current generator 7. The A.C. signal developed by the alternating current amplifier 4 of FIGURE 1 is applied to a base electrode 52 of a PNP transistor connected in the grounded-emitter configuration. The transistor is provided with an emitter 54, which is coupled to a source of positive voltage through a bias resistor 56 shunted by a single by-pass capacitor 57. The transistor 53 is further provided with a collector 58 connected via a lead 59 to the recorder 6. The base-to-emitter circuit of the transistor supplies the required rectifying action for demodulation, while the carrier is by-passed by capacitor 57. The grounded-emitter connection of the transistor 53 is employed since such a circuit has a high output impedance. This feature of the circuit provided the required high impedance for damping the galvanometer mechanism of galvanometer type recorder 6.

Referring further to the circuit diagram of FIGURE 9 of the accompanying drawings, a collector electrode 61 of an NPN transistor 62 is connected to the lead 59 of the recorder 6. The transistor 62 is provided with a base electrode 63 connected to a source of fixed potential and is also provided with an emitter electrode 64 connected through a variable resistor 66 to a source of negative potential. The transistor 62 and its associated circuit elements constitute the bucking current generator 7 of FIGURE 1. The variable resistor 66 is employed to adjust the current flowing through the resistor 62 so that it may precisely cancel the current applied to the recorder 6 through the transistor 53, when there is no D.C. input signal applied to the system, as illustrated in FIGURE 1 of the accompany drawings. This adjustment may be made while the input to the system is short-circuited. The arrangement of the PNP and NPN transistors 53 and 62, respectively, is employed so that the transistors may be connected directly in series, and therefore, may effect direct series opposition of the currents produced by each.

Continuing with the description of the various components of the system of the invention, reference is made to FIGURE 10 wherein oscillator 3 of FIGURE 1, is illustrated in detail. The oscillator circuit is a phase-shift oscillator employing a transistor 67 having collector-to-base feed-back. The transistor 67 is connected in a grounded-emitter circuit that includes an emitter electrode 68, a collector-electrode 69 and a base-electrode 71. The emitter electrode 68 is connected to ground through a bias resistor 72, which is shunted by a by-pass capacitor 73 and the collector electrode 69 is connected to the lower end of a primary winding 74 of an output transformer 76. The upper end of the primary winding 74, as viewed in FIGURE 10, is connected via a lead 77 to a regulated negative voltage supply. The collector electrode 69 of the transistor 67 is connected through a phase-shift circuit generally designated by the reference numeral 82, connected in series, to the base electrode 71 of the transistor 67. The path through the phase-shift circuit 82 constitutes a positive phase-shift feed-back circuit which supports oscillations in the circuit. The lead 77 is connected through a resistor 83 and capacitor 84 to ground and the junction of these two elements is connected through a resistor 85 to the base electrode 71 of the transistor 67. The circuit, as thus far described, operates as an uncompensated phase-shift, collector-to-base feed-back, grounded emitter oscillator.

Conventional transistor oscillators are subject to amplitude variations with temperature because the gain of the transistor increases with an increase in temperature. Obviously, such operation cannot be permitted in a high-quality instrument. In order to stabilize the amplitude of the oscillator, illustrated in FIGURE 10, against changes in temperature, there is employed a temperature sensitive diode 86 connected directly across the primary winding 74 of the output transformer 76, with its cathode connected to the collector electrode of the transistor 67. The diode serves to limit the voltage swing of the collector electrode when the swing is in the forward conducting direction of the diode only. Specifically, when the collector electrode 69 swings negative with respect to the zero or reference voltage, the diode is rendered conductive after this swing has overcome the back bias on the diode developed by the negative steady-state current drawn through the transformer primary winding 74. When the diode 86 is rendered conductive, it diverts a portion of the current drawn by the transistor, as determined by the relative impedances of the diode and transformer winding. The temperature characteristic of the diode 86 is such that its impedance decreases with temperature, so that as the gain of the transistor 67 increases with temperature, an increasingly large percentage of the current supplied by the transistor 67 is diverted through the diode 86. Therefore, in spite of an increase in current through the transistor there is not a corresponding increase through the transformer winding 74, the apparent impedance of the diode 86 and transformer winding 74 being reduced as the impedance of the diode 86 is reduced.

Due to the relatively long time constant of the feed-back network, that is, of the phase-shift circuit 82 and the capacitor 81, the clipping action affected by the diode 86 is so slight as to produce a negligible effect on the wave shape of the output voltage and this effect can be discounted. The circuit illustrated in FIGURE 10 has been found to be highly efficient in achieving its intended purpose and in a specific instrument, it was found that a temperature change of 90° F. effected less than a 3% change in the output amplitude of the oscillator.

It is apparent from the above detailed description, that the present invention provides a system having highly linear amplification characteristics and a high degree of temperature stability all being accomplished with a minimum number of components and a minimum of circuit complexity.

Although the invention has been shown and described in terms of a preferred embodiment, it will be appreciated that various changes and modifications can be made which do not depart from the inventive concepts as expressed in the claims that follow.

What is claimed is:

1. An amplifier for direct current signals comprising an oscillator for generating alternating current voltages, an input circuit for receiving direct current signals, a modulator connected to amplitude modulate said alternating current voltages in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal.

2. An amplifier for direct current signals comprising an oscillator for generating alternating current voltages, an input circuit for receiving direct current signals, a modulator connected to amplitude modulate said alternating current voltages in accordance with said direct current signals, said modulator producing alternating current signals of a predetermined amplitude in the absence of direct current signals, said modulator including means for shifting the output voltage versus input voltage characteristic thereof with respect to the input voltage origin, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal.

3. An amplifier for direct current signals comprising an oscillator for generating alternating current voltages, an input circuit for receiving direct current signals, a modulator connected to amplitude modulate said alternating current voltages in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal, said demodulator comprising a grounded-emitter transistor stage having a by-passed bias resistor in the emitter circuit.

4. An amplifier for direct current signals comprising an oscillator for generating alternating current voltages, an input circuit for receiving direct current signals, a modulator connected to amplitude modulate said alternating current voltages in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and bucking means for subtracting from said direct current a further current equal to the demodulated signal resulting from said alternating output voltage produced by said modulator in the absence of an input signal, said bucking means comprising a transistor having a base electrode, a collector electrode and an emitter electrode, means for connecting said base electrode to a source of fixed reference potential, a variable resistor connected in circuit with said emitter electrode and means connecting said collector in circuit opposition to said demodulator.

5. An amplifier for direct current signals comprising an oscillator for generating alternating current voltages, an input circuit for receiving direct current signals, a modulator connected to amplitude modulate said alternating current voltage in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal, said oscillator comprising a transistorized oscillator having a transistor and a load impedance connected in series, a diode connected across said load impedance, said diode having a negative forward impedance temperature-coefficient and means for biasing said diode to conduct only during a small portion of the excursion of the oscillatory voltage in a direction to overcome the diode bias.

6. An amplifier for direct current signals comprising an oscillator for generating an alternating current voltage, an input circuit for receiving direct current signals, a modulator connected to amplitude modulate said alternating current voltage in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal, said oscillator comprising a transistor connected as a phase-shift, collector-to-base feed-back grounded emitter oscillator, a load impedance connected in a series with a collector electrode of said transistor, a diode connected across said load impedance, said diode having a negative forward impedance temperature coefficient and means for biasing said diode to conduct only during a small portion of the excursion of the oscillatory voltage in a direction to overcome the diode bias.

7. An amplifier for direct current signals comprising an oscillator for generating alternating current voltages, an input circuit for receiving direct current signals, a modulator connected to amplitude modulate said alternating current voltages in accordance with said direct current signals, said modulator producing alternating current signals of a predetermined amplitude in the absence of direct current signals, an amplifier connected to amplify the output of said modulator, a demodulator connected to demodulate the output of said amplifier so as to produce a direct current of a magnitude determined by the modulation envelope of the amplified output voltage and means connected to the output of said demodulator for subtracting from said direct current a further current equal to the demodulated signal resulting from said alternating output voltage produced by said modulator in the absence of an input signal, said modulator comprising two transistors each having collector, emitter and base electrodes, means for applying a direct voltage across said emitter electrodes, a center-tapped source of alternating signals connected between said base electrodes, said collector electrodes being connected together and to the center tap of said source, a load impedance connected between said collector electrodes and said emitter electrode of one of said transistors, and a variable resistor connected between the base electrode and the emitter electrode of said one transistor.

References Cited in the file of this patent

UNITED STATES PATENTS

| | | |
|---|---|---|
| 2,524,165 | Freedman et al. | Oct. 3, 1950 |
| 2,751,501 | Eberhard | June 19, 1956 |
| 2,795,653 | McCoy | June 11, 1957 |
| 2,810,110 | Paz | Oct. 15, 1957 |
| 2,846,652 | Cluwen | Aug. 5, 1958 |
| 2,851,604 | Clapper | Sept. 9, 1958 |
| 2,886,657 | Hirtreiter | May 12, 1959 |

FOREIGN PATENTS

| | | |
|---|---|---|
| 527,042 | Canada | June 26, 1956 |